(12) United States Patent
Yanagimoto

(10) Patent No.: US 6,401,087 B2
(45) Date of Patent: *Jun. 4, 2002

(54) INFORMATION RETRIEVAL SYSTEM, APPARATUS AND METHOD FOR SELECTING DATABASES USING RETRIEVAL TERMS

(75) Inventor: Hidekazu Yanagimoto, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,203

(22) Filed: Jan. 8, 1999

(30) Foreign Application Priority Data

Jan. 8, 1998 (JP) .......................... 10-002452

(51) Int. Cl.[7] ............................................. G06F 17/30
(52) U.S. Cl. ............................. 707/5; 707/10; 709/218; 709/217; 709/219
(58) Field of Search ................. 707/1–10; 709/203, 709/217, 218, 219

(56) References Cited

U.S. PATENT DOCUMENTS

| | | | | |
|---|---|---|---|---|
| 5,920,856 A | * | 7/1999 | Syeda-Mahmood | 707/3 |
| 6,006,218 A | * | 12/1999 | Breese et al. | 707/3 |
| 6,018,733 A | * | 1/2000 | Kirsch et al. | 707/3 |
| 6,026,398 A | * | 2/2000 | Brown et al. | 707/5 |

FOREIGN PATENT DOCUMENTS

| | | |
|---|---|---|
| JP | 3-62167 | 3/1991 |
| JP | 3-94374 | 4/1991 |
| JP | 4-332084 | 11/1992 |
| JP | 5-101101 | 4/1993 |
| JP | 7-56932 | 3/1995 |
| JP | 7-85072 | 3/1995 |
| JP | 8-16619 | 1/1996 |
| JP | 96-DPS-76 | 5/1996 |
| JP | 9-153058 | 6/1997 |

OTHER PUBLICATIONS

Shimizu et al. (A decision making support system for selecting appopriate online database, IEEE, 1991, p. 322–329).*
Chang et al. (Efficient resource selection in distributed visual information systems, ACM, 1997, pp. 203–213).*
Sheldon et al., Discover: a resource discovery system based on content routing, 1995, Computer Networks and ISDN Systems, vol. 27 (953–972).*
Bowman et al., The Harvest information discovery and access system, 1995, Computer Networks and ISDN System, vol. 28 (119–125).*

* cited by examiner

*Primary Examiner*—Kim Vu
*Assistant Examiner*—Joon Huoan Hwang
(74) *Attorney, Agent, or Firm*—Foley & Lardner

(57) ABSTRACT

An information retrieval system, apparatus, and method are provided, for automatically selecting suitable database(s) from among a plurality of databases via a simple operation, with excellent accuracy. The method comprises the steps of extracting evaluated values which correspond to each of designated retrieval terms and are assigned to the databases from a storage device which stores the evaluated values assigned to the databases and the retrieval terms in a correspondence relationship; calculating evaluated values which are respectively assigned to the databases, based on the evaluated values extracted for each retrieval term; selecting databases to be searched from among the plurality of databases in accordance with the calculated evaluated values for each database; issuing a data-search request based on the retrieval terms to the selected databases; and correcting the evaluated values stored in the storage device and correspond to the retrieval terms, in accordance with search results.

10 Claims, 5 Drawing Sheets

| DATABASE NAME | FIELD NAME | | | |
|---|---|---|---|---|
| | ECONOMY | HISTORY | SCIENCE | .... |
| DATABASE 10a | 30 | 82 | 55 | .... |
| DATABASE 10b | 75 | 60 | 67 | .... |
| DATABASE 10c | 90 | 23 | 40 | .... |

INFORMATION RETRIEVAL SYSTEM, APPARATUS AND METHOD FOR SELECTING DATABASES USING RETRIEVAL TERMS

BACKGROUND OF THE INVENTION

1. Field of the Invention

The present invention relates to an information retrieval system, apparatus, and method for selecting suitable database(s) among a plurality of databases for retrieving information. The present invention also relates to a storage medium storing the processing programs for executing the above method.

This application is based on Japanese Patent Application No. Hei 10-002452, the contents of which are incorporated herein by reference.

2. Description of the Related Art

Recently, along with the progress of network technologies, the number of databases for retrieving information via a personal computer, work station, or the like has been increased. When a user of a personal computer or work station is going to retrieve a specific information item from a database which is connected to a network, if all databases are searched, the cost necessary for retrieval is high and a great number of data items are examined. Therefore, in such a case, it is required to select suitable database(s) from among a plurality of databases.

As a technique of selecting suitable database(s) from among a plurality of databases on a network, the following are known: a database selection processor disclosed in Japanese patent application, First Publication, No. Hei 5-101101 (called the first conventional example, hereinbelow), an information retrieval system disclosed in Japanese patent application, First Publication, No. Hei 7-56932 (called the second conventional example, hereinbelow), a database selector disclosed in Japanese patent application, First Publication, No. Hei 7-85072 (called the third conventional example, hereinbelow), and a database selection system disclosed in Japanese patent application, First Publication, No. Hei 9-153058 (called the fourth conventional example, hereinbelow).

In the first conventional example, relevant fields are narrowed down to a few candidates in accordance with a user's selecting and designating operation based on data about the field for search and about the relevant databases, and a database is selected. In the second conventional example, a database is selected with reference to a retrieval term input by a user. In the third conventional example, a score for each database with respect to a retrieval term input by a user is calculated with reference to a database determination table, and a database is selected in accordance with calculated scores. In the fourth conventional example, an expectation is calculated based on the number of records in each database corresponding to a retrieval term, and a database is selected in accordance with calculated expectations.

However, in the above first conventional example, it is necessary for a user to prepare all data about the field for search and about the relevant databases; thus, operations are troublesome. In the above second conventional example, if a search is executed using a plurality of retrieval terms, database selection is not performed using all the retrieval terms. Therefore, in this case, the accuracy in selecting suitable databases is degraded.

In addition, in the above third conventional example, the database determination table is generated based on documents which are randomly extracted from databases; thus, it is necessary to access databases only for generating the database determination table. Therefore, processing time and cost are increased. In the above fourth conventional example, it is necessary to manage all retrieval terms and the number of records corresponding to each retrieval term stored in each database. Therefore, if a database is updated, each number of records must also be revised, and a large amount of memory area is necessary. Accordingly, processing time and cost are increased.

SUMMARY OF THE INVENTION

In order to solve the above problems, it is an objective of the present invention to provide an information retrieval system, apparatus, and method for automatically selecting suitable database(s) from among a plurality of databases via a simple operation, with excellent accuracy. It is another objective of the present invention to provide a storage medium storing processing programs for executing the above method.

To achieve the above objectives, the present invention provides an information retrieval system including a plurality of databases storing information items and an information retrieval apparatus, connected via a network to the plurality of databases, for selecting a database from among the plurality of databases, issuing a data-search request via the network to the selected database, and receiving search results in response to the request via the network:

wherein the information retrieval apparatus comprises:
evaluated value storing means for storing a plurality of terms and related evaluated values, each term corresponding to a plurality of evaluated values assigned to the plurality of databases;
evaluated value extracting means for extracting the evaluated values which have been respectively assigned to the plurality of databases and correspond to each of designated retrieval terms;
database selecting means for:
calculating evaluated values which are respectively assigned to the plurality of databases, based on the evaluated values extracted for each retrieval term by the evaluated value extracting means, and
selecting one or more databases to be searched from among the plurality of databases in accordance with the calculated evaluated values for each database;
search requesting means for issuing a data-search request based on the retrieval terms to the databases selected by the database selecting means; and
evaluated value correcting means for correcting the evaluated values which are stored in the evaluated value storing means and correspond to the retrieval terms, in accordance with search results in response to the data-search request.

According to the above information retrieval system, when data are retrieved from a plurality of databases based on a plurality of retrieval terms, evaluated values assigned to the plurality of databases are extracted by the evaluated value extracting means for each retrieval term, and evaluated values for each database are newly calculated based on the extracted evaluated values. Therefore, in the above information retrieval system, databases to be searched can be selected with a plurality of retrieval terms and thus the accuracy for selecting suitable databases is superior.

Every time the databases are accessed, the evaluated values stored in the evaluated value storing means are updated by the evaluated value correcting means, in accordance with the actual search results. Therefore, if data are updated on the database side, the evaluated values can be updated in consideration of the updated data. Therefore, the above information retrieval system can achieve further superior accuracy for selecting databases to be searched. In addition, no operation by the user is necessary for updating the evaluated values; thus, no complicated operation needs to be carried out by the user.

The present invention also provides an information retrieval apparatus for selecting a database from among a plurality of databases and issuing a data-search request to the selected database, comprising:

evaluated value storing means for storing a plurality of terms and related evaluated values, each term corresponding to a plurality of evaluated values assigned to the plurality of databases;

evaluated value extracting means for extracting the evaluated values which have been respectively assigned to the plurality of databases and correspond to each of designated retrieval terms;

database selecting means for:
calculating evaluated values which are respectively assigned to the plurality of databases, based on the evaluated values extracted for each retrieval term by the evaluated value extracting means, and
selecting one or more databases to be searched from among the plurality of databases in accordance with the calculated evaluated values for each database;

search requesting means for issuing a data-search request based on the retrieval terms to the databases selected by the database selecting means; and evaluated value correcting means for correcting the evaluated values which are stored in the evaluated value storing means and correspond to the retrieval terms, in accordance with search results in response to the data-search request.

According to the above information retrieval apparatus, when data are retrieved from a plurality of databases based on a plurality of retrieval terms, evaluated values assigned to the plurality of databases are extracted by the evaluated value extracting means for each retrieval term, and evaluated values for each database are newly calculated based on the extracted evaluated values. Therefore, in the above information retrieval apparatus, databases to be searched can be selected with a plurality of retrieval terms and thus the accuracy for selecting suitable databases is superior.

Every time the databases are accessed, the evaluated values stored in the evaluated value storing means are updated by the evaluated value correcting means, in accordance with the actual search results. Therefore, if data are updated on the database side, the evaluated values can be updated in consideration of the updated data. Therefore, the above information retrieval apparatus can achieve further superior accuracy for selecting databases to be searched. In addition, no operation by the user is necessary for updating the evaluated values; thus, no complicated operation needs to be carried out by the user.

The information retrieval apparatus may further comprise an input means for inputting the retrieval terms. In this case, the evaluated value extracting means may extract the evaluated values which correspond to each of the retrieval terms input from the input means.

The information retrieval apparatus may further comprise an input means for inputting a character sequence; and retrieval term extracting means for analyzing the character sequence input from the input means and extracting retrieval terms. In this case, the evaluated value extracting means may extract the evaluated values which correspond to each of the retrieval terms extracted by the retrieval term extracting means.

In the information retrieval apparatus, the retrieval terms may be respectively weighted. In this case, the database selecting means may calculate the evaluated values which are respectively assigned to the plurality of databases, further based on the weights assigned to each retrieval term.

In the information retrieval apparatus, the evaluated value storing means may comprise a first storage means for storing a plurality of terms and related fields, each term corresponding to a field; and a second storage means for storing, in a correspondence relationship, the fields stored in the first storing means and evaluated values assigned to the plurality of databases for each field. In this case, the evaluated value extracting means may comprise a first extracting means for extracting the fields corresponding to the retrieval terms from the first storage means, and a second extracting means for extracting the evaluated values which respectively correspond to the fields extracted by the first extracting means and correspond to the plurality of databases. According to this arrangement, the capacity of a storage medium necessary for the evaluated value storing means can be reduced.

In the information retrieval apparatus, the database selecting means may select a plurality of databases in accordance with the calculated evaluated values for each database. In this case, the search requesting means may issue a data-search request to the plurality of databases selected by the database selecting means; and the evaluated value correcting means may correct the evaluated values in a manner such that a database from which a larger number of data were retrieved is detected with reference to the search results, and the evaluated values assigned to this database with respect to the retrieval terms (or with respect to the fields which correspond to the retrieval terms) are corrected to higher values. According to this arrangement, if a database is updated and the amount of data thereof is increased, the evaluated values assigned to the database are upgraded. In addition, such a data correction in the information retrieval apparatus can correspond to each data update on the database side. Therefore, according to the present arrangement, databases including more data relating to the retrieval terms can be selected.

The information retrieval apparatus may further comprise a retrieval term determining means for determining, for each retrieval term, whether a term corresponding to the retrieval term is stored in the evaluated value storing means; and a register means for newly registering the retrieval term which was determined by the retrieval term determining means as having no corresponding term stored in the evaluated value storing means, and related evaluated values to the evaluated value storing means. According to this arrangement, if a data search is performed using a retrieval term which has not yet been stored in the evaluated value storing means, evaluated values corresponding to this retrieval term can be automatically registered, and no complicated operation by the user is necessary.

The present invention also provides an information retrieval method for selecting a database from among a plurality of databases and issuing a data-search request to the selected database, comprising:

an evaluated value extracting step of extracting evaluated values which correspond to each of designated retrieval terms and are assigned to the plurality of databases from an evaluated value storing means which stores the evaluated values assigned to the plurality of databases and the retrieval terms in a correspondence relationship;

a database selecting step of:
  calculating evaluated values which are respectively assigned to the plurality of databases, based on the evaluated values extracted for each retrieval term in the evaluated value extracting step, and
  selecting one or more databases to be searched from among the plurality of databases in accordance with the calculated evaluated values for each database;
a search requesting step of issuing a data-search request based on the retrieval terms to the databases selected in the database selecting step; and
an evaluated value correcting step of correcting the evaluated values which are stored in the evaluated value storing means and correspond to the retrieval terms, in accordance with search results in response to the data-search request.

The present invention also provides a computer readable storage medium storing a program for selecting a database from among a plurality of databases and issuing a data-search request to the selected database, the program comprising:

an evaluated value extracting step of extracting evaluated values which correspond to each of designated retrieval terms and are assigned to the plurality of databases from an evaluated value storing means which stores the evaluated values assigned to the plurality of databases and the retrieval terms in a correspondence relationship;
a database selecting step of:
  calculating evaluated values which are respectively assigned to the plurality of databases, based on the evaluated values extracted for each retrieval term in the evaluated value extracting step, and
  selecting one or more databases to be searched from among the plurality of databases in accordance with the calculated evaluated values for each database;
a search requesting step of issuing a data-search request based on the retrieval terms to the databases selected in the database selecting step; and
an evaluated value correcting step of correcting the evaluated values which are stored in the evaluated value storing means and correspond to the retrieval terms, in accordance with search results in response to the data-search request.

DESCRIPTION OF THE PREFERRED EMBODIMENTS

An embodiment according to the present invention will be explained with reference to the drawings.

Figure 1:
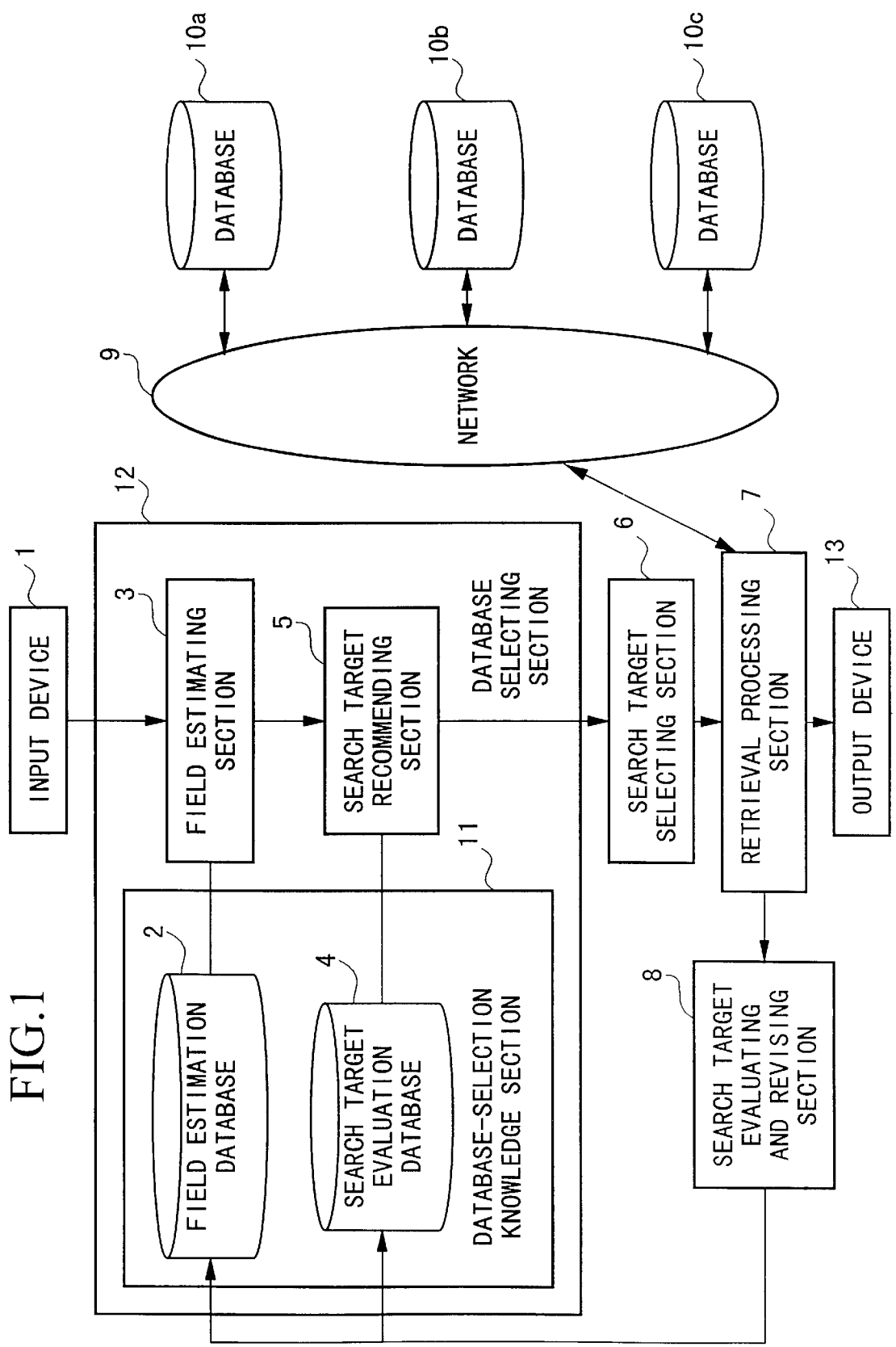
FIG. 1 is a block diagram showing the functional structure of the information retrieval system as an embodiment according to the present invention.

FIG. 1 is a block diagram showing the functional structure of the information retrieval system of the embodiment.

As shown in the figure, this information retrieval system comprises a plurality of databases 10a to 10c which are connected to network 9, and an information retrieval apparatus for issuing an information retrieval request (i.e., search request) via the network 9 to databases 10a to 10c.

The network 9 is, for example, a wide-area communication network such as the Internet. The databases 10a to 10c are searched so as to retrieve data, in accordance with a retrieval term sent from the information retrieval apparatus via network 9. The retrieved information is sent back to the information retrieval apparatus via network 9.

The information retrieval apparatus can be constructed using a personal computer or a work station. The functional structure includes input device 1, database selecting section 12, search target selecting section 6; retrieval processing section 7, search target evaluating and revising section 8, and output device 13. The database selecting section 12 consists of database-selection knowledge section 11 which includes field estimation database 2 and search target evaluation database 4, and field estimating section 3 and search target recommending section 5.

The input device 1 can be constructed using a keyboard or the like. A user operates this input device so as to input retrieval term(s) for retrieving information from databases 10a to 10c. The user also inputs some designation commands using the input device 1. The number of retrieval terms input from the input device 1 may be one or more. When a plurality of retrieval terms is input, retrieval formula (s) such as "AND" and "OR" are also input.

Figures 2, 3:
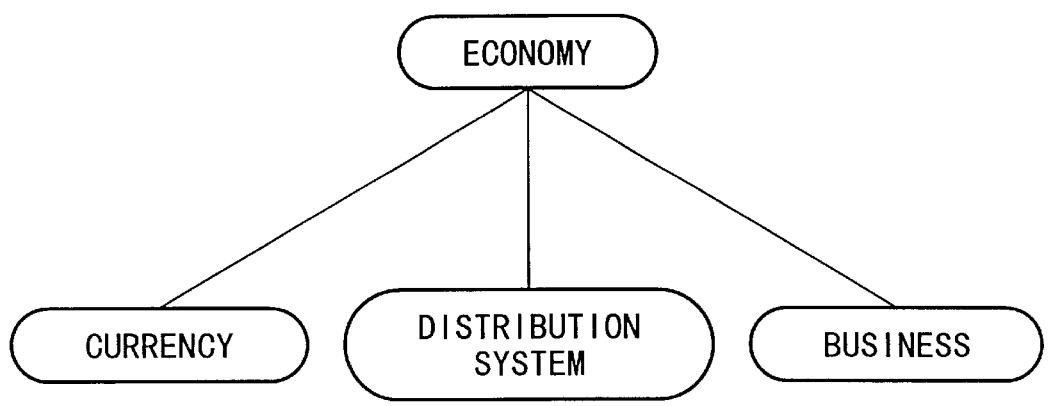
FIG. 2 is a diagram showing an example of data stored in the field estimation database in FIG. 1.
FIG. 3 is a diagram showing an example of data stored in the search target evaluation database in FIG. 1.

The field estimation database 2 is stored in a hard disk which constitutes the present information retrieval apparatus. The field estimation database 2 has a storage format having a tree structure as shown in FIG. 2. The example shown in FIG. 2 indicates that keywords "CURRENCY", "DISTRIBUTION SYSTEM", and "BUSINESS" are related to the field "ECONOMY". The field estimation database 2 stores data relating to various fields sufficient for assigning each information item stored in databases 10a–10c to a specific field.

The field estimating section 3 comprises a storage device for storing a processing program and a CPU for executing this processing program. This field estimating section 3 compares each retrieval term input from the input device 1 via an operation by a user with keywords stored in the field estimation database 2. If a keyword which agrees with the target retrieval term (i.e., the same keyword as the retrieval term) is found, the field estimating section 3 extracts data of a relevant field from the field estimation database 2. If no keyword which agrees with the target retrieval term is found, then the field estimating section 3 determines that the field corresponding to the retrieval term is "default" and performs the following necessary operations.

The field estimating section 3 informs the search target recommending section 5 of the determined field (data) corresponding to the retrieval apparatus. If a plurality of retrieval terms is input from the input device 1, the field estimating section 3 respectively determines fields corresponding to these retrieval terms, and communicates the determined fields to the search target recommending section 5.

The search target evaluation database 4 is provided in the hard disk which constitutes the present information retrieval system. In this database 4, as shown in FIG. 3, evaluated values with respect to databases 10a to 10c are stored. These evaluated values are determined for each field stored in the field estimation database 2. In the determination, a larger value is assigned to a database which stores a larger number of data related to a target field, while a smaller value is assigned to a database which stores a smaller number of relevant data. In the example shown in FIG. 3, when field "ECONOMY" is selected (or determined), databases 10*a*, 10*b*, and 10*c* respectively have evaluated values 30, 75, and 90.

The search target recommending section 5 comprises a storage device for storing a processing program and a CPU for executing this processing program. The search target recommending section 5 searches the search target evaluation database 4 for each retrieval term communicated by field estimating section 3, and extracts evaluated values (assigned to databases 10*a* to 10*c*) corresponding to the retrieval term. These evaluated values extracted by the section 5 from the search target evaluation database 4 are communicated to search target selecting section 6.

The search target selecting section 6 comprises a storage device for storing a processing program and a CPU for executing this processing program. As shown in a flowchart explained later, the search target selecting section 6 refers to the evaluated values assigned to databases 10*a* to 10*c* with respect to each of relevant retrieval terms, and calculates evaluated values with respect to each database (not each retrieval term) so as to narrow and select target databases to be searched. The number of selected databases can be designated, for example, via the input device 1 operated by the user. If there is no such designation, a default number may be used. The search target selecting section 6 informs the retrieval processing section 7 of information for identifying the selected databases (for example, database names). In addition, retrieval term(s) and formula(s) input from the input device 1 are also communicated to the retrieval processing section 7.

The retrieval processing section 7 comprises a storage device for storing a processing program, a CPU for executing this processing program, and a communication device for accessing the databases 10*a* to 10*c* via network 9. The retrieval processing section 7 accesses target databases (selected by the search target selecting section 6) and issues a request for making a search using the relevant retrieval term(s) and formula(s) to the databases. Retrieved results of the search performed in accordance with the request are returned via the network 9 to the retrieval processing section 7. The section 7 receives the retrieved results and outputs them via the output device 13, and also communicates the results to the search target evaluating and revising section 8.

The search target evaluating and revising section 8 comprises a storage device for storing a processing program and a CPU for executing this processing program. As shown in a flowchart explained later, the evaluating and revising section 8 revises the search target evaluation database 4 based on the retrieved results communicated from the retrieval processing section 7. If no field has been estimated for a retrieval term with respect to the present search, the retrieval term is added to the field estimation database 2 (as explained later in detail).

The output device 13 comprises display and printing units, and outputs the results retrieved from selected databases, communicated from the retrieval processing section 7, so as to show the user the results.

Here, a single CPU or a plurality of CPUs may be used as a constituent of each of field estimating section 3, search target recommending section 5, search target selecting section 6, retrieval processing section 7, and search target evaluating and revising section 8. If a plurality of CPUs is used, different kinds of CPUs may be used.

Hereinbelow, operations of the information retrieval system in the present embodiment will be explained.

First, the user inputs a retrieval term corresponding to information which the user would like to retrieve, by using input device 1. If the user inputs two or more retrieval terms, the user further inputs retrieval formula(s) such as "AND" and "OR".

The retrieval term input from the input device 1 is sent to the field estimating section 3, and a field corresponding to this retrieval term is extracted from the field estimation database 2. If a plurality of retrieval terms is input, fields which respectively correspond to the retrieval terms are extracted. If the retrieval term has not yet been registered in the field estimation database 2, then "default" is returned as the field data. The extracted field(s) are communicated to the search target recommending section 5, and evaluated values for each field, assigned to databases 10*a* to 10*c*, are extracted from the search target evaluation database 4. All extracted evaluated values are sent from the search target recommending section 5 to the search target selecting section 6, and an operation for narrowing and selecting databases to be searched is performed.

Figure 4:
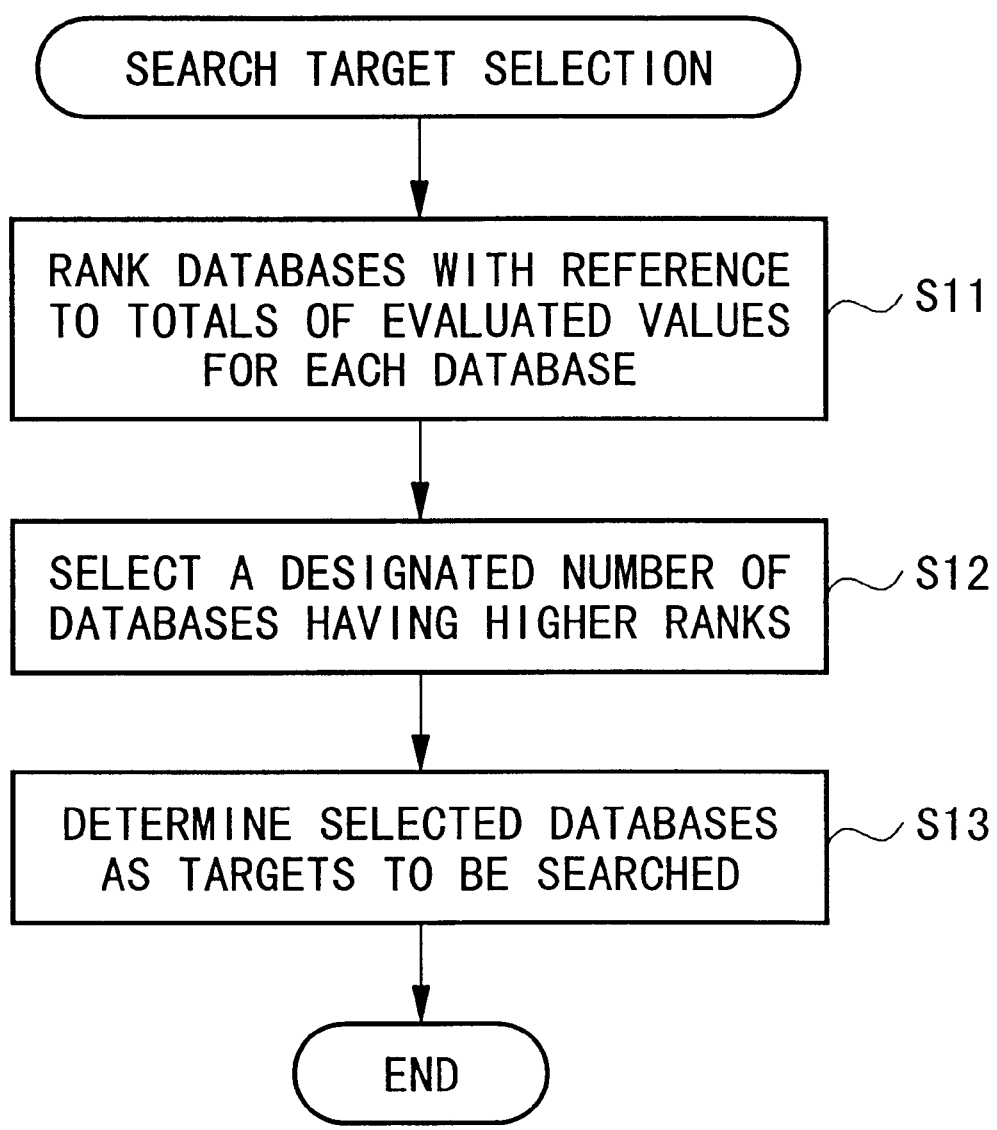
FIG. 4 is a flowchart showing an operation performed by the search target selecting section in FIG. 1.

FIG. 4 is a flowchart showing an operation performed by the search target selecting section 6, for narrowing and selecting databases to be searched.

The search target selecting section 6 first calculates the total of evaluated values for each of databases 10*a* to 10*c*, based on evaluated value data sent from the search target recommending section 5. Here, if the same retrieval term has been input a plural number of times, the evaluated value related to the corresponding field is also added the number of times. According to the calculated total values (for each database) with respect to the evaluated values, the search target selecting section 6 ranks the databases 10*a* to 10*c* and determines the ranking between them (see step S11).

Next, the search target selecting section 6 selects one or more databases of the higher ranks from among databases 10*a* to 10*c* which were ranked in the above step S11, the number of selected databases designated by the user operating the input device 1, or being a default number if there is no designation (see step S12).

The search target selecting section 6 determines the databases selected in step S12 as target databases to be searched, and informs the retrieval processing section 7 of information for identifying the target databases (for example, database names) (see step S13). The processes shown in the flowchart of FIG. 4 are finished, and then the processing by the retrieval processing section 7 is started.

In addition to the information for identifying the target databases, retrieval term(s) and formula(s) input via the input device 1 are also communicated to the retrieval processing section 7. The section 7 sends the selected databases a request for search according to these retrieval terms and formulas, via network 9. The search of the databases which received the request is then executed so as to retrieve data in accordance with the retrieval terms and formulas, and search or retrieved results are returned via network 9 to retrieval processing section 7.

The search results received by the retrieval processing section 7 are sent to the output device 13 and the search target evaluating and revising section 8. Accordingly, the search results are output from the output device 13 so as to show the user the results. Simultaneously, the search target evaluating and revising section 8 executes an operation for revising the database-selection knowledge section 11 which includes databases for evaluating the target databases.

Figure 5:
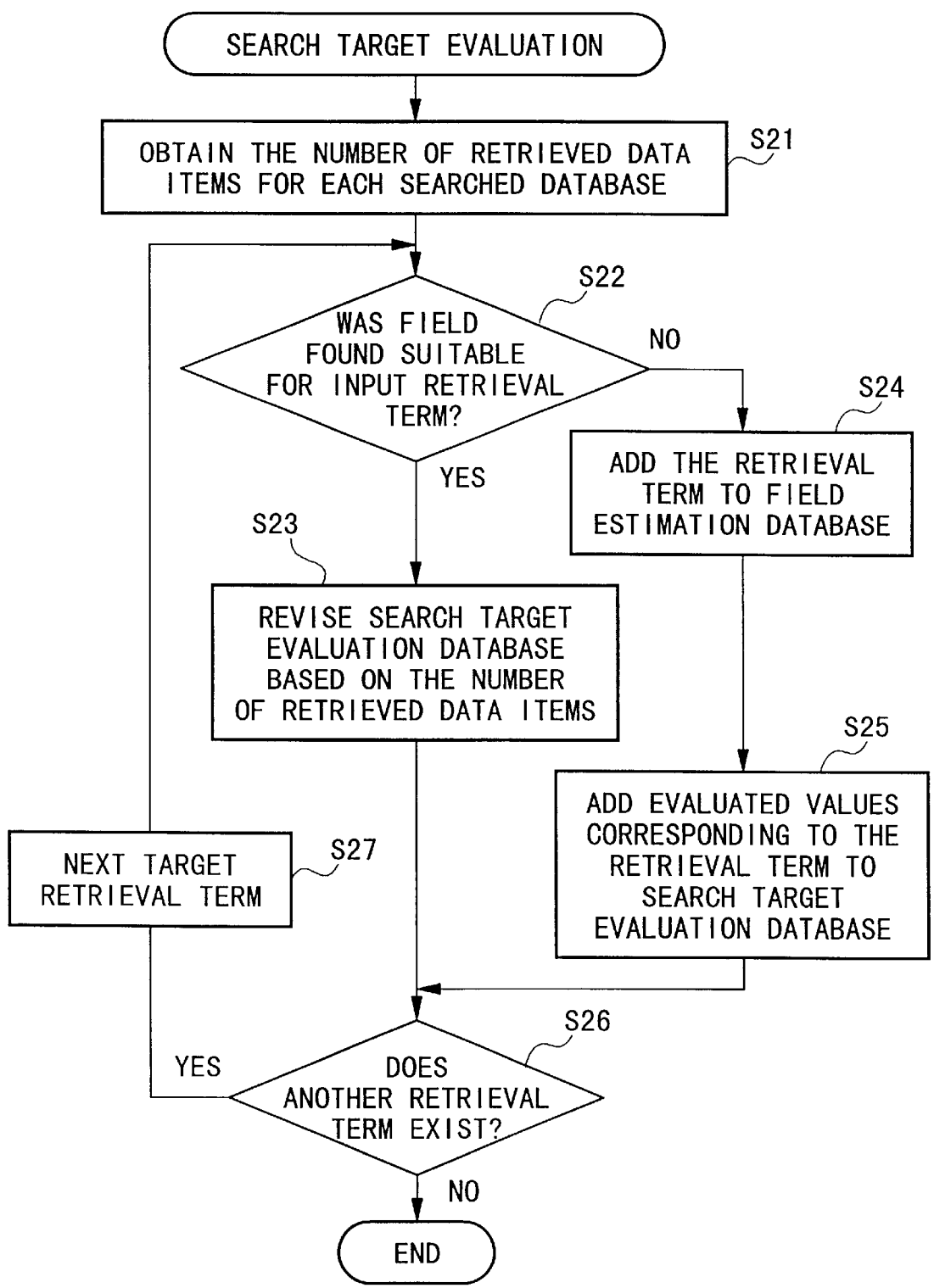
FIG. 5 is a flowchart showing an operation performed by the search target evaluating and revising section in FIG. 1.

FIG. 5 is a flowchart showing the operation (performed by the search target evaluating and revising section 8) for revising the database-selection knowledge section First, the search target evaluating and revising section 8 detects the number of retrieved data items for each database which was searched, based on the search results sent from the retrieval processing section 7 (see step S21).

The search target evaluating and revising section 8 then targets each of the input retrieval terms in turn, and determines whether a suitable field could be estimated, that is, whether a keyword corresponding to the target retrieval term has been registered in the field estimation database 2 (see step S22).

If it is determined in the step S22 that the field could be estimated, then, the search target evaluating and revising section 8 revises the contents registered in the search target evaluation database 4 based on the number of retrieved data items for each database, which was obtained in the above step S21. As an example of this revision of the registered contents (i.e., evaluated values), a series of correction values which gradually decrease are respectively assigned to the databases arranged in order of the number of retrieval data items (that is, a larger correction value is assigned to a database having a larger number of retrieval data items). Here, the original evaluated value, which corresponds to the target retrieval term and has been registered in the search target evaluation database 4, is multiplied by a value used for weighting, and an assigned correction value is added to the product. In an example case in which the original evaluated value is 30 and a weighting value is 0.8, and a correction value of 20 is determined, then a revised value is determined as:

$$30 \times 0.8 + 20 = 44$$

The determined evaluated value is then registered in the search target evaluation database 4 so that the database is revised (see step S23). The operation then shifts to step S26.

If it is determined in the step S22 that no field suitable for the target retrieval term could be estimated, then, for example, the retrieval term is added to the field estimation database 2 as both a keyword and a corresponding field (see step S24). As evaluated values corresponding to the field which was newly added in the step S24, a series of evaluated values which gradually decrease are respectively assigned to the databases arranged in order of the number of retrieval data items (that is, a larger evaluated value is assigned to a database having a larger number of retrieval data items) (see step S25). The operation then shifts to step S26.

In step S26, it is determined whether another input retrieval term exists. If it is determined that another retrieval term was input, then this retrieval term is determined as the next target retrieval term (see step S27) and the operation returns to the above step S22.

If it is determined in step S26 that no retrieval term remains, then the operation shown in this flowchart is terminated.

The operations of the above information retrieval system will be further explained using a concrete example.

In the following explanations, it is assumed that the search target evaluation database 4 has the contents as shown in FIG. 3, and that the number of databases to be selected by the search target selecting section 6 is 2.

If the user inputs two retrieval terms as "CURRENCY" and "CIVIL WAR ERA" and a retrieval formula "AND", then two fields "ECONOMY" and "HISTORY" corresponding to these retrieval terms are extracted from the field estimation database 2 by the field estimating section 3, and the extracted fields are communicated to the search target recommending section 5.

The search target recommending section 5 extracts evaluated value "30" assigned to database 10*a*, evaluated value "75" assigned to database 10*b*, and evaluated value "90" assigned to database 10*c*, with respect to field "ECONOMY". The search target recommending section 5 also extracts evaluated value "82" assigned to database 10*a*, evaluated value "60" assigned to database 10*b*, and evaluated value "23" assigned to database 10*c*, with respect to field "HISTORY". These extracted evaluated values are sent to the search target selecting section 6. Additionally, the retrieval terms "CURRENCY" and "CIVIL WAR ERA" and retrieval formula "AND" are also communicated to the retrieval processing section 7.

The search target selecting section 6 calculates the total of relevant evaluated values (sent from the search target recommending section 5) for each database. Accordingly, total evaluated values "112", "135", and "113" are respectively obtained for databases 10*a*, 10*b*, and 10*c*. The ranking of the databases is then determined in order of the evaluated values so that the order of "database 10*b*, database 10*c*, database 10*a*" is determined (see step S11). The search target selecting section 6 then selects two databases among from these databases in accordance with the designated selection number "2", that is, databases 10*b* and 10*c* having higher ranks are selected (see step S12). The search target selecting section 6 determines these selected databases as target databases to be searched, and information relating to the databases 10*b* and 10*c*, such as database names, is communicated to the retrieval processing section 7 (see step S13).

The retrieval processing section 7 issues a search request with retrieval terms "CURRENCY" and "CIVIL WAR ERA" and retrieval formula "AND", via network 9 to both databases 10*b* and 10*c*. In response to the search request, relevant data are extracted from the databases 10*b* and 10*c* and returned via network 9 to the retrieval processing section 7. These search results are sent to the output device 13 so as to shown the data the user, and also sent to the search target evaluating and revising section 8.

Here, it is assumed that the number of data items retrieved from database 10*b* is larger than the number of data items retrieved from database 10*c*. When the search target evaluating and revising section 8 detects and obtains the number of retrieved data items for each of databases 10*b* and 10*c* (see step S21), the section 8 determines whether a suitable field could be estimated by the field estimating section 3 for the first retrieval. term "CURRENCY" (see step S22). Here, a field could be estimated for the retrieval term "CURRENCY"; thus, the search target evaluating and revising section 8 executes the operation for revising the search target evaluation database 4 (see step S23).

In an example of the revising operation, first, the evaluated values of databases 10*b* and 10*c* with respect to field "ECONOMY" corresponding to the retrieval term "CURRENCY" are respectively multiplied by 0.8 as a weighting value. Then, correction value "20" is added to the product with respect to database 10*b* from which a larger number of data items were retrieved, while correction value "5" is added to the product with respect to database 10*c* from which a smaller number of data items were retrieved. Accordingly, updated evaluated values "80" and "77" are respectively calculated for databases 10*b* and 10*c* with respect to field "ECONOMY", so that the search target evaluation database 4 is updated.

At the present step, another retrieval term "CIVIL WAR ERA" exists (see steps S26 and S27); thus, the search target evaluating and revising section 8 calculates updated evaluated values "68" and "23" to be assigned to databases 10*b* and 10*c* with respect to field "HISTORY" which corresponds to the retrieval term "CIVIL WAR ERA" in a similar operation, and the search target evaluation database 4 is further updated (see steps S22 and S23).

No other retrieval term exists (see step S26); thus, the correction of evaluated values performed by the search target evaluating and revising section 8 is finished.

As explained above, according to the information retrieval system in the present embodiment, if a plurality of retrieval terms are input from input device 1, fields which are respectively suitable for these retrieval terms are extracted, and evaluated values for databases 10*a* to 10*c* are extracted for each field. Then, total evaluated values for each database are respectively calculated, and databases to be searched are selected. Accordingly, databases to be searched can be selected based on a plurality of retrieval terms; thus, the databases can be selected with a superior accuracy.

Additionally, every time when search results are sent from databases 10*a* to 10*c*, the search target evaluating and revising section 8 corrects the relevant evaluated values stored in the search target evaluation database 4 based on the search results. Therefore, if information data stored in the databases 10*a* to 10*c* is updated, it is possible to select databases in consideration of the updated data. Therefore, selection of target databases can be performed with a further superior accuracy. Furthermore, no user operation is necessary for correcting the evaluated values; thus, no complicated operation is carried out by the user.

If a retrieval term which has not yet been registered as a keyword in the field estimation database 2 is input via the input device 1, this retrieval term is registered into the field estimation database 2 as a new keyword and a corresponding field (that is, the keyword and the corresponding field are the same in this case). Therefore, no operation by the user is necessary for registering data in the field estimation database 2; thus, no complicated operation is carried out by the user also in this case.

Furthermore, the database-selection knowledge section 11 has a hierarchical structure including the field estimation database 2 and the search target evaluation database 4 so that necessary storage capacity in the storage medium can be reduced.

In the above embodiment, functions of the field estimating section 3 and the search target recommending section 5 are realized using a storage device including a processing program and a CPU for executing the processing program. However, these functions may be realized using dedicated hardware.

In the above embodiment, the database-selection knowledge section 11 consists of field estimation database 2 and search target evaluation database 4, and evaluated values for each database are obtained by the search target recommending section 5, based on fields extracted by the field estimating section 3. However, in the present invention, a database in which keywords and evaluated values (which are compared for each search in the present embodiment) are directly related with each other may constitute the database-selection knowledge section 11. In this case, fewer accessing operations (so as to access the database-selection knowledge section 11) are necessary in order to select target databases; thus, a higher processing speed can be realized. In consideration of the storage capacity, the structure including the field estimation database 2 and the search target evaluation database 4 is more advantageous.

Figure 6:
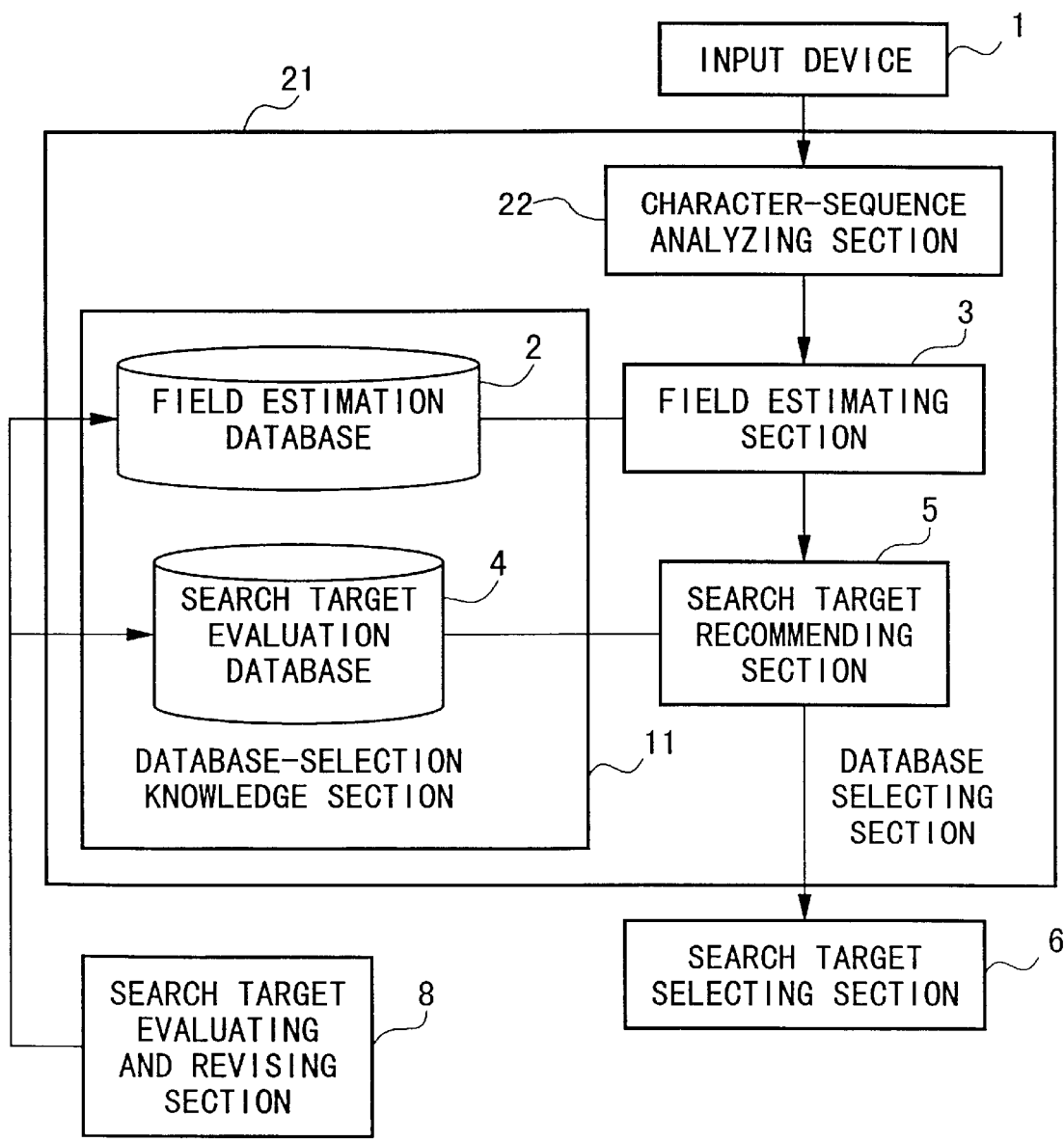
FIG. 6 is a block diagram showing the functional structure of the information retrieval system as a variation of the embodiment according to the present invention.

In the above embodiment, one or more retrieval terms are input from input device 1. However, a character sequence may be input via the input device 1 for searching databases 10*a* to 10*c* using this character sequence. In this case, database selecting section 21 may be provided as shown in FIG. 6, which comprises character-sequence analyzing section 22 for performing morphemic analysis of the input character-sequence and extracting a relevant keyword. The keyword extracted by the character-sequence analyzing section 22 is communicated to the field estimating section 3.

Also in the above embodiment, if a retrieval term input from the input device 1 has not yet been registered in the field estimation database 2, a keyword and a corresponding field are newly registered in the field estimation database 2 during the operation for estimating and revising the search target, these registered data being the same as the input retrieval term. However, the retrieved results may be subjected to the morphemic analysis, and a field may be newly determined and registered in the field estimation database 2 based on results of the morphemic analysis.

Also in the above embodiment, if a plurality of retrieval terms are input from input device 1, the search target selecting section 6 simply sums up evaluated values which respectively correspond to input retrieval terms, for each database. However, the retrieval terms may be respectively weighted. For example, if a database has weight "2" and evaluated value a with respect to retrieval term A, and weight "1" and evaluated value b with respect to retrieval term B, then the total evaluated value of this database is "2a+b".

Also in the above embodiment, the search target selecting section 6 selects one or more target databases to be searched, and the number of selected databases has been designated by inputting operation using the input device 1, or is a default number. However, the search target selecting section 6 may select each target database whose total of evaluated values with respect to retrieval terms is larger than a predetermined threshold value.

Also in the above embodiment, the processing programs executed in the field estimating section 3 and in the search target recommending section 5 (as shown in FIGS. 4 and 5) are stored in the storage device included in each section. However, these programs may be stored in a computer-readable storage medium such as a CD-ROM or a floppy disk so as that the programs can be distributed.

What is claimed is:

1. An information retrieval system including a plurality of databases storing information and an information retrieval apparatus, connected via a network to the plurality of databases, for selecting a database from among the plurality of databases, issuing a data-search request via the network to the selected database, and receiving search results in response to the request via the network;

wherein the information retrieval apparatus comprises:

evaluated value storing means for storing a plurality of terms and related evaluated values, each term corresponding to a plurality of evaluated values assigned to the plurality of databases;

evaluated value extracting means for extracting the evaluated values which have been respectively assigned to the plurality of databases and correspond to each of designated retrieval terms;

database selecting means for:

calculating evaluated values which are respectively assigned to the plurality of databases, each evaluated value being obtained by calculating a total of the relevant evaluated values extracted for each retrieval term by the evaluated value extracting means, and selecting one or more databases to be searched from among the plurality of databases in accordance with the calculated evaluated values for each database;

search requesting means for issuing a data-search request based on the retrieval terms to the databases selected by the database selecting means;

evaluated value correcting means for correcting the evaluated values which are stored in the evaluated value storing means and correspond to the retrieval terms, in accordance with search results in response to the data-search request; and retrieval term determining means for determining, for each retrieval term, whether a term corresponding to the retrieval term is stored in the evaluated value storing means; and register means for newly registering the retrieval term which was determined by the retrieval term determining means as having no corresponding term stored in the evaluated value storing moans, and related evaluated values to the evaluated value storing means.

2. An information retrieval apparatus for selecting a database from among a plurality of databases and issuing a data-search request to the selected database, comprising:

evaluated value storing means for storing a plurality of terms and related evaluated values, each term corresponding to a plurality of evaluated values assigned to the plurality of databases;

evaluated value extracting means for extracting the evaluated values which have been respectively assigned to the plurality of databases and correspond to each of designated retrieval terms;

database selecting means for:
calculating evaluated values which are respectively assigned to the plurality of databases, each evaluated value being obtained by calculating a total of the relevant evaluated values extracted for each retrieval term by the evaluated value extracting means, and
selecting one or more databases to be searched from among the plurality of databases in accordance with the calculated evaluated values for each database;

search requesting means for issuing a data-search request based on the retrieval terms to the databases selected by the database selecting means;

evaluated value correcting means for correcting the evaluated values which are stored in the evaluated value storing means and correspond to the retrieval terms, in accordance with search results in response to the data-search request; and retrieval term determining means for determining, for each retrieval term, whether a term corresponding to the retrieval term is stored in the evaluated value storing means; and register means for newly registering the retrieval term which was determined by the retrieval term determining means as having no corresponding term stored in the evaluated value storing means, and related evaluated values to the evaluated value storing means.

3. An information retrieval apparatus as claimed in claim 2, further comprising:

input means for inputting the retrieval terms, and wherein the evaluated value extracting means extracts the evaluated values which correspond to each of the retrieval terms input from the input means.

4. An information retrieval apparatus as claimed in claim 2, further comprising:

input means for inputting a character sequence; and retrieval term extracting means for analyzing the character sequence input from the input means and extracting retrieval terms, and wherein the evaluated value extracting means extracts the evaluated values which correspond to each of the retrieval terms extracted by the retrieval term extracting means.

5. An information retrieval apparatus as claimed in claim 2, wherein:

the retrieval terms are respectively weighted; and the database selecting means calculates the evaluated values which are respectively assigned to the plurality of databases, further based on the weights assigned to each retrieval term.

6. An information retrieval apparatus as claimed in claim 2, wherein:

the evaluated value storing means comprises:
first storage means for storing a plurality of terms and related fields, each term corresponding to a field; and
second storage means for storing, in a correspondence relationship, the fields stored in the first storage means and evaluated values assigned to the plurality of databases for each field, and the evaluated value extracting means comprises:
first extracting means for extracting the fields corresponding to the retrieval terms from the first storage means, and
second extracting means for extracting the evaluated values which respectively correspond to the fields extracted by the first extracting means and correspond to the plurality of databases.

7. An information retrieval apparatus as claimed in claim 6, wherein:

the database selecting means selects a plurality of databases in accordance with the calculated evaluated values for each database;

the search requesting means issues a data-search request to the plurality of databases selected by the database selecting means; and the evaluated value correcting means corrects the evaluated values in a manner such that a database from which a larger number of data were retrieved is detected with reference to the search results, and the evaluated values assigned to this database with respect to the fields which correspond to the retrieval terms are corrected to higher values.

8. An information retrieval apparatus as claimed in claim 2, wherein:

the database selecting means selects a plurality of databases in accordance with the calculated evaluated values for each database;

the search requesting means issues a data-search request to the plurality of databases selected by the database selecting means; and the evaluated value correcting means corrects the evaluated values in a manner such that a database from which a larger number of data were retrieved is detected with reference to the search results, and the evaluated values assigned to this database with respect to the retrieval terms are corrected to higher values.

9. An information retrieval method for selecting a database from among a plurality of databases and issuing a data-search request to the selected database, comprising:

an evaluated value extracting step of extracting evaluated values which correspond to each of designated retrieval terms and are assigned to the plurality of databases from an evaluated value storing means which stores the evaluated values assigned to the plurality of databases and the retrieval terms in a correspondence relationship;

a database selecting step of:
  calculating evaluated values which are respectively assigned to the plurality of databases, each evaluated value being obtained by calculating a total of the relevant evaluated values extracted for each retrieval term in the evaluated value extracting step, and
  selecting one or more databases to be searched from among the plurality of databases in accordance with the calculated evaluated values for each database;

a search requesting step of issuing a data-search request based on the retrieval terms to the databases selected in the database selecting step;

an evaluated value correcting step of correcting the evaluated values which are stored in the evaluated value storing means and correspond to the retrieval terms, in accordance with search results in response to the data-search request; and a retrieval term determining stop of determining, for each retrieval term, whether a term corresponding to the retrieval term is stored in the evaluated value storing means; and a registering step of newly registering the retrieval term which was determined in the retrieval term determining step as having no corresponding term stored in the evaluated value storing means, and related evaluated values to the evaluated value storing means.

10. A computer readable storage medium storing a program for selecting a database form among a plurality of databases and issuing a data-search request to the selected database, the program comprising:

an evaluated value extracting step of extracting evaluated values which correspond to each of designated retrieval terms and are assigned to the plurality of databases from an evaluate value storing means which stores the evaluated values assigned to the plurality of databases and the retrieval terms in a correspondence relationship;

a database selecting step of:
  calculating evaluated values which are respectively assigned to the plurality of databases, each evaluated value being obtained by calculating a total of the relevant evaluated values extracted for each retrieval term in the evaluated value extracting step, and
  selecting one or more databases to be searched from among the plurality of databases in accordance with the calculated evaluated values for each database;

a search requesting step of issuing a data-search request based on the retrieval terms to the databases selected in the database selecting step;

an evaluated value correcting step of correcting the evaluated values which are stored in the evaluated value storing means and correspond to the retrieval terms, in accordance with search results in response to the data-search request; and a retrieval term determining step of determining, for each retrieval term, whether a term corresponding to the retrieval term is stored in the evaluated value storing means; and a registering step of newly registering the retrieval term which was determined in the retrieval term determining step as having no corresponding term stored in the evaluated value storing means, and related evaluated values to the evaluated value storing means.

* * * * *